(12) United States Patent
Squedin et al.

(10) Patent No.: US 10,176,176 B2
(45) Date of Patent: Jan. 8, 2019

(54) ASSISTANCE FOR VIDEO CONTENT SEARCHES OVER A COMMUNICATION NETWORK

(75) Inventors: Sylvain Squedin, Nozay (FR); Alexandre Vanbelle, Antony (FR)

(73) Assignee: Alcatel Lucent, Boulogne Boulancourt (FR)

( * ) Notice: Subject to any disclaimer, the term of this patent is extended or adjusted under 35 U.S.C. 154(b) by 474 days.

(21) Appl. No.: 14/114,008

(22) PCT Filed: Apr. 27, 2012

(86) PCT No.: PCT/EP2012/057720
§ 371 (c)(1),
(2), (4) Date: Jan. 6, 2014

(87) PCT Pub. No.: WO2012/156193
PCT Pub. Date: Nov. 22, 2012

(65) Prior Publication Data
US 2014/0122460 A1 May 1, 2014

(30) Foreign Application Priority Data

May 17, 2011 (FR) ...................... 11 54263

(51) Int. Cl.
*G06F 17/00* (2006.01)
*G06F 17/30* (2006.01)
(52) U.S. Cl.
CPC .... *G06F 17/30023* (2013.01); *G06F 17/3082* (2013.01); *G06F 17/30781* (2013.01); *G06F 17/30823* (2013.01)

(58) Field of Classification Search
CPC ......... G06F 17/30867; G06F 17/30522; G06F 17/30693; G06F 17/30873; G06F 17/30967; G06F 17/00
See application file for complete search history.

(56) References Cited

U.S. PATENT DOCUMENTS

2004/0111432 A1   6/2004 Adams, Jr. et al.
2008/0313140 A1* 12/2008 Pereira .............. G06F 17/30858
(Continued)

FOREIGN PATENT DOCUMENTS

| CN | 101802823 | 8/2010 |
|---|---|---|
| EP | 0609517 | 12/1993 |
| JP | 2009-295054 | 12/2009 |

OTHER PUBLICATIONS

Changsheng Xu et al., "A Novel Framework for Semantic Annotation and Personalized Retrieval of Sports Video," IEEE Transactions on Multimedia, IEEE Service Center, vol. 10, No. 3, XP011346513, pp. 421-436, Apr. 2008.

(Continued)

*Primary Examiner* — Truong V Vo
(74) *Attorney, Agent, or Firm* — Fay Sharpe LLP

(57) ABSTRACT

A method for assisting video content searches over a communication network by a user, comprising: A step of determining a first content item (CZ) by said user; A step of automatically extracting semantic data from this first content item; A step of automatically generating queries for at least one service, as a function of semantic data, making it possible to retrieve a set of videos on this service or these services; A step of presenting that set of video content to the user.

9 Claims, 3 Drawing Sheets

(56) References Cited

U.S. PATENT DOCUMENTS

| | | |
|---|---|---|
| 2009/0055417 A1 | 2/2009 | Hannuksela |
| 2009/0106307 A1* | 4/2009 | Spivack ................. G06Q 30/02 |
| 2009/0292685 A1 | 11/2009 | Liu et al. |
| 2010/0153324 A1* | 6/2010 | Downs ................ G06F 17/2745 |
| | | 706/21 |
| 2010/0169318 A1 | 7/2010 | Thompson et al. |
| 2011/0087703 A1* | 4/2011 | Varadarajan ..... H04N 21/23418 |
| | | 707/794 |

OTHER PUBLICATIONS

International Search Report for PCT/EP2012/057720 dated Jun. 22, 2012.

* cited by examiner

FIG_2

ASSISTANCE FOR VIDEO CONTENT SEARCHES OVER A COMMUNICATION NETWORK

The present invention relates to access to video content provision services over the Internet. These services are generalist platforms such as "YouTube", "Vimeo", and "DailyMotion", or else more specialised platforms (education sector, medical sector, etc.).

These two types of services share a common characteristic of enabling users to upload their own content to the platform. The result is that a very large amount of video content is available across all of these services. Currently, approximately 355 hours of videos are uploaded each minute on the "YouTube" service.

A counterpart to this explosion in available content is that the majority of the content does not receive sufficient visibility. Thus, only 40% of the video content available will be viewed more than 300 times.

This low ratio is primarily due to the fact that it has become extremely difficult for users to identify the video that interests them among such a large amount of content.

Video content is associated with descriptions, most often textual, which, through a free text field or a set of labels, enable searches based on key words. Each user wishing to upload a new video is thus asked to provide a description enabling other users to find his or her video using a search engine incorporated in to the service or an external one (such as "Google", "Bing", or "Yahoo!").

However, this solution is not sufficient as the descriptions are provided by the users and thus are completely subjective. In particular, they illustrate the individual users' interests, may be in various languages, and within a given language, comprise a selection of key words including several possible synonyms. To find a video, users must therefore select the appropriate key words, without the tools with which to determine them. How can one know the labels and vocabulary selected by the user who uploaded the video?

The resulting problem is two-fold:
Searches do not necessarily provide the most relevant video content;
A video may not be sufficiently visible to users conducting searches.

The purpose of the present invention is to improve the situation.

To do so, its first object is a method for assisting video content searches over a communication network by a user, comprising:
A step of determining a first content item by said user;
A step of automatically extracting semantic data from this first content item;
A step of automatically generating queries for at least one service, as a function of said semantic data, making it possible to retrieve a set of videos on said at least one service;
A step of presenting said set of videos to said user.

According to one embodiment of the invention, the method may also comprise a step of selecting a subset of videos from among said set, as a function of a criterion of semantic proximity between the first content item and a description associated with the video content in this set.

At least one service may be determined as a function of the semantic data.

These steps may be triggered by the selection of a first content item (CZ) in a man-machine interface (WB) and by the selection of a software function accessible through said man-machine interface.

The step of automatically extracting semantic data may consist of extracting the "subject-verb-object" relationships. The queries generated may be constructed based on said relationships.

The invention also has the object of a communication terminal equipped with processing means to implement a method as previously described, as well as a computer program equipped with coding means to implement this method.

The invention also has the object of a man-machine interface for a communication terminal, equipped with the means to enable a user to select a first content item and the means to make it possible to trigger:
A step of automatically extracting semantic data from said first content item;
A step of automatically generating queries for at least one service, as a function of these semantic data, making it possible to retrieve a set of videos on said at least one service;
A step of presenting that set of video content to the user.

In this way, based on a first content item, generally textual, the invention makes it possible to eliminate, or at least reduce, user subjectivity in order to improve the visibility of video content and the relevance of searches. It makes it possible to reduce the semantic gap between video content and search subjects.

The invention and its benefits will become more clearly apparent in the following description, with reference to the attached figures.

Figure 1:
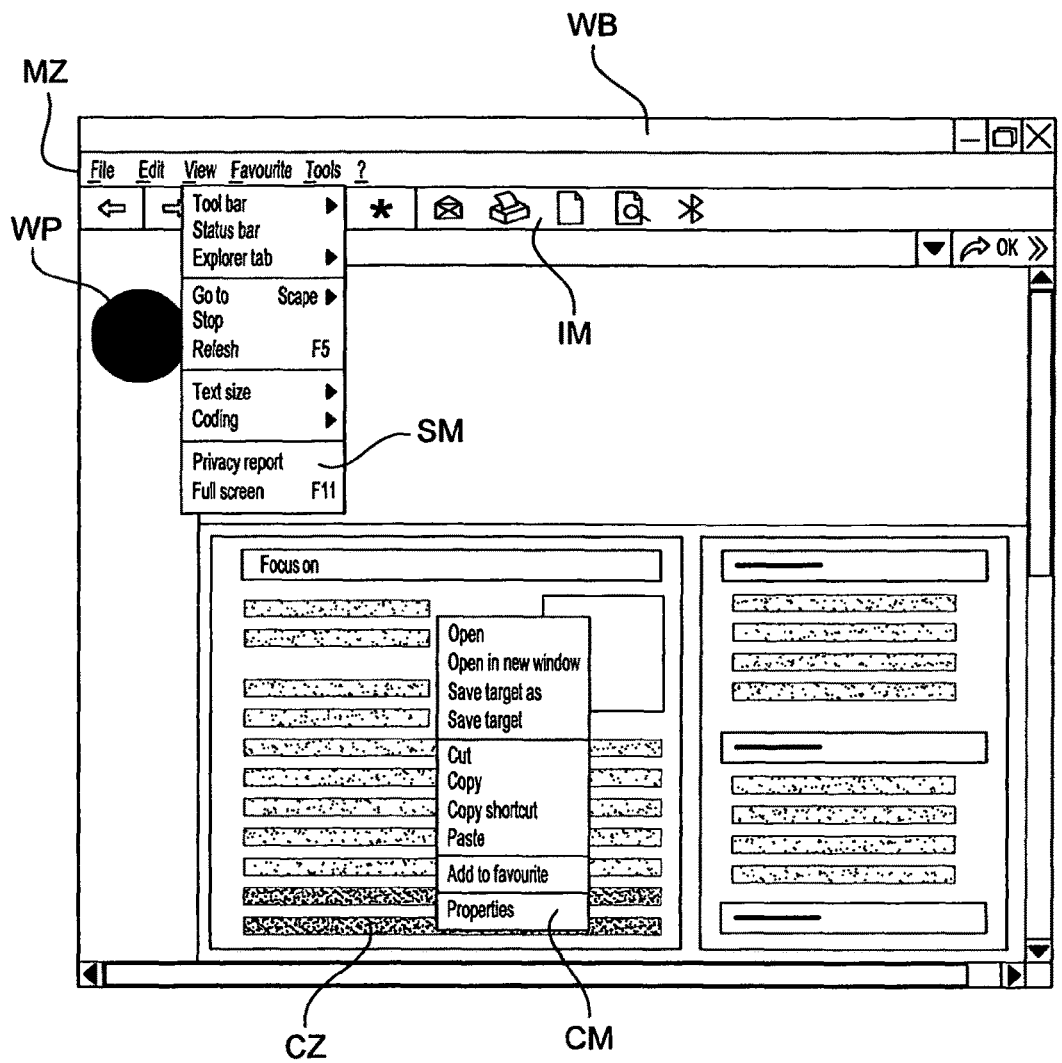
FIG. 1 depicts a man-machine interface implementing the invention.

FIG. 1 depicts a web browser enabling a user to access web pages from their URLs (Unified Resource Locator). This browser presents the user with a man-machine interface or "window" WB. This window shows several parts, including a browser space WP in which the pages are displayed (including video content) and a menu zone MZ.

This menu zone may, itself, comprise drop-down menus SM and icons IM. Through this menu zone MZ, the browser provides the user with access to its various functions. A given function may also be accessible through drop-down menus, icons, or both. This is an ergonomic choice made by the developer of the browser.

Additionally, these and/or other functions may also be accessible to a user through a contextual menu CM. Typically, under the Windows™ operating system from the Microsoft company, such a contextual menu is opened with the right menu button on the mouse and its elements depend upon the position of the mouse pointer and the state of the browser.

In the example in FIG. 1, the browser space WP shows text content. The man-machine interface WB makes it possible to select all or part of this text content. This selection may be made by known methods, using a mouse or any other pointing device, or the keyboard, etc. In the example depicted, only a CZ zone is selected.

Once this first content CZ is selected, the user can select the function corresponding to the invention from a menu in the man-machine interface WB. This function may be selected from the drop-down menu SM, an icon IM, or the contextual menu CM. This selection may consist of clicking on an icon IM or selecting an element from the drop-down menu SM or the contextual menu CM.

The invention may also apply to software applications other than a browser. In particular, it may apply to a file display application. A user reading an electronic book (or "e-book") or a file in "PDF" format from the Adobe company may, as described above, select a content zone and trigger the function from a menu in the software application in question based on the selected content.

The software application may also be a word processor, such as the "Word" software from the Microsoft company.

Similarly, the invention may apply to content other than text content. Therefore, it is possible to select images, sound, or video.

Mechanisms other than selection by the user to determine the initial content may be possible. For example determination may be automatic as a function of a displayed web page, a video being played, the content of an email being read, etc.

Figure 2:
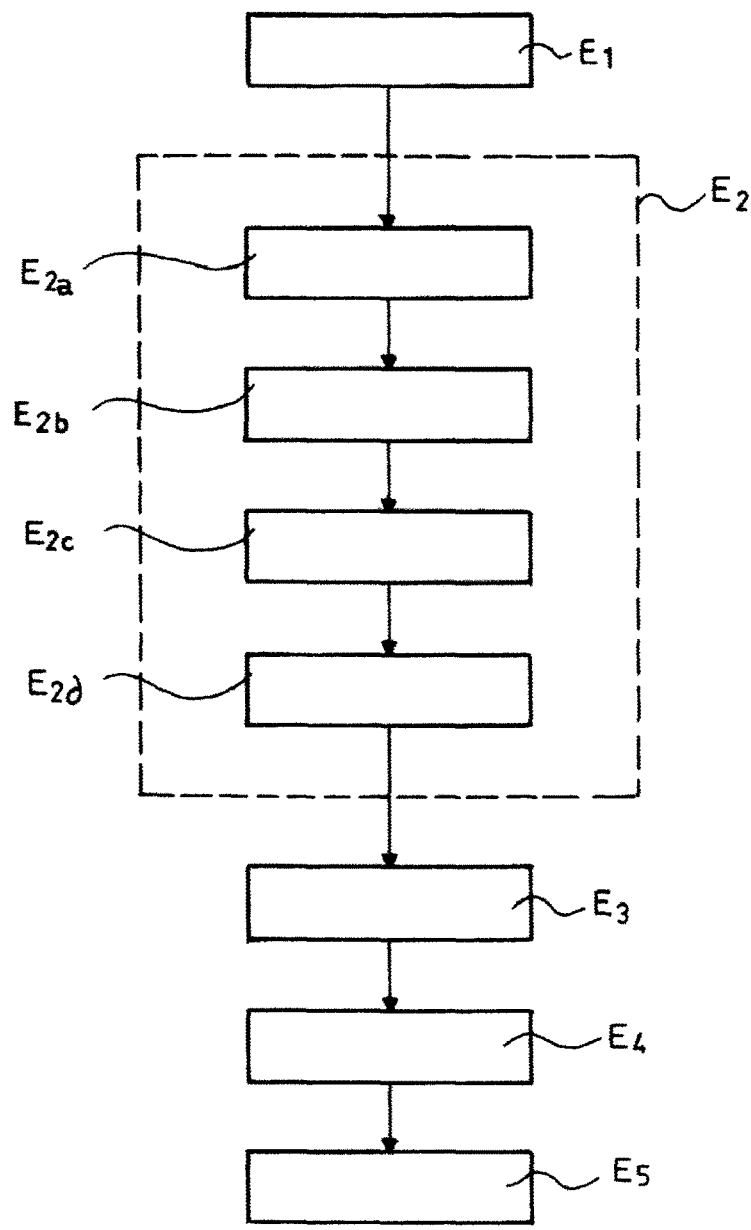
FIG. 2 is a flowchart schematically depicting a possible chaining of the steps of the method according to the invention.

This step of determining a first content item CZ is depicted by step E1 in FIG. 2.

Selection of a first content item CZ and the appropriate function triggers a first algorithmic step of automatically extracting semantic data from this first content item.

This step is depicted as step E2.

This step may be subdivided into several sub-steps.

A first sub-step E2a consists of determining the type of content, which is to say whether the content is text, video, image, audio, etc.

As a function of the content type, various algorithms may then be used to extract the semantic data. These algorithms may be implemented by separate software modules.

The following sub-steps of the extraction step E2 may depend upon the content type.

In the case of text content, a second sub-step E2b may consist of extracting raw semantic data from the content item CZ.

These raw semantic data may be extracted sentence by sentence or sentence bloc by sentence bloc.

The extraction of sentence blocs is conditioned by the presence of personal pronouns that reference a previously identified entity. One may then be able to say that the subject of each sentence is the same and therefore identify a coherent bloc of sentences on the same topic.

Not all words may be extracted. Some words may be omitted, as they are not useful for understanding the text.

The extraction may be carried out in several steps:

Deletion of so-called "stop words": coordinating conjunctions, etc.

Usage of a statistical and natural language algorithm to analyse the remaining information and extract a set of key words that have a discriminant meaning. For example in a description of a person, the word "eyes" is not discriminant because everyone has them. On the other hand, the word "one-eyed" is discriminant. To do so, one can use a corpus that gives information on the frequency of a word in a set of documents: the lower the frequency, the greater the a priori importance of the word.

Based on these raw semantic data, a third sub-step E2c makes it possible to determine refined semantic data. These refined semantic data may be "concepts"; names of persons, companies, locations (cities, countries, regions, etc.); dates; etc.

"Concepts" may be seen as the primary semantic data from the set of raw semantic data. They may be determined in various ways. For example each raw semantic datum may be associated with an occurrence counter across all of the text content CZ. The concepts are then the semantic data corresponding to the highest occurrences.

It is also possible to use an ontology in order to take into account synonyms and raw data from various semantic levels, and in particular hypernyms (which is to say more general raw semantic data encompassing one or more more specific semantic data items).

Concepts may then be determined by the number of occurrences of raw semantic data aggregated based on synonymies and hypernyms. For example text content containing occurrences of the raw data "orange", "grape", "banana", etc. may bring out a concept "fruit".

It is possible to bring out the most important concept, for example, the one associated with the strongest occurrence, in order to determine a category to which the text content CZ belongs. This category may be searched, taking into consideration the successive hypernyms of the previously determined concepts.

Names of persons, companies, locations, etc. may be determined from a dictionary. This dictionary may be internal to the inventive software means or it may be remote on the Internet in the form of a web service or any other technical device (database, etc.).

Figure 3:
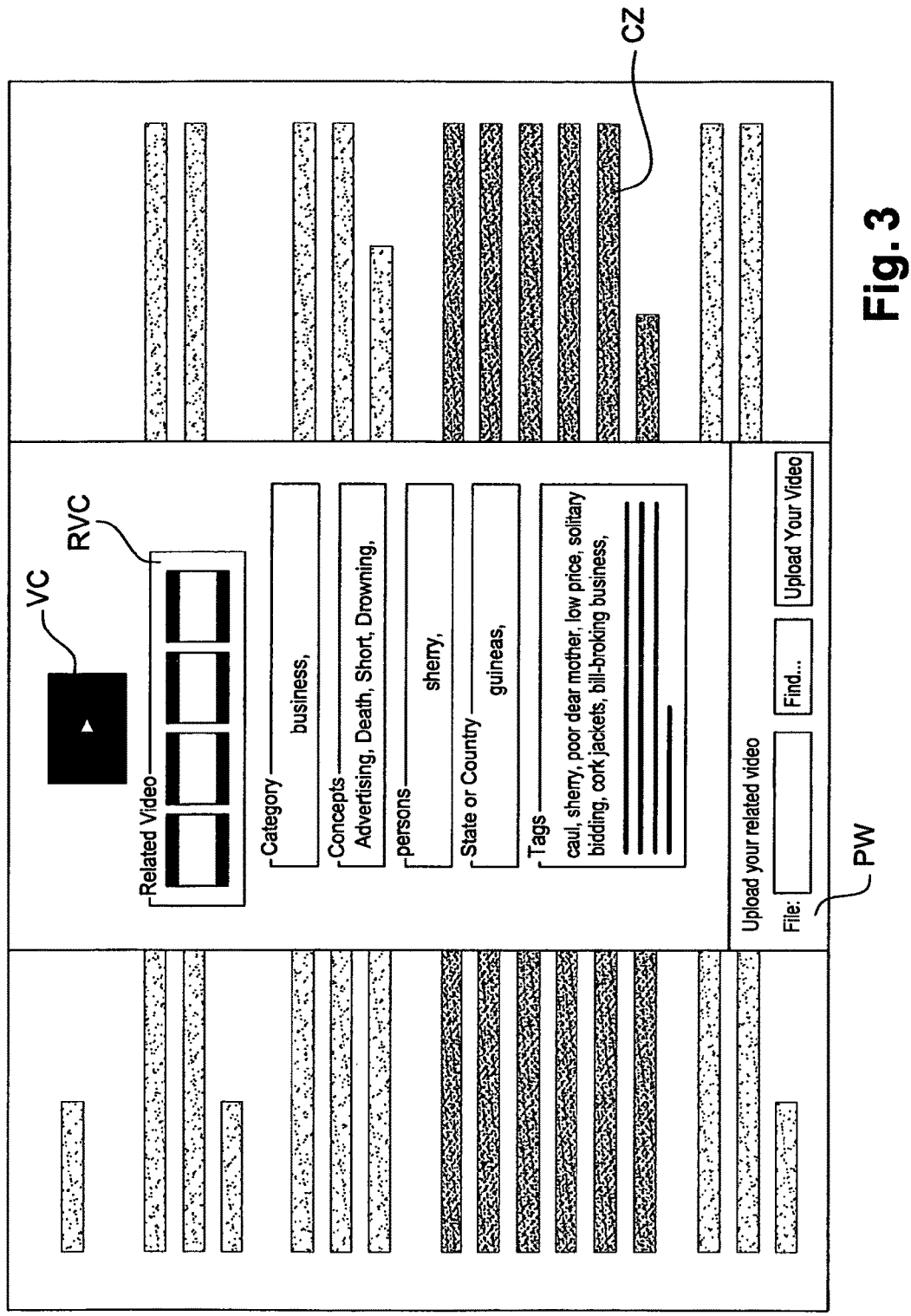
FIG. 3 depicts an example of text content, and the extracted semantic data.

FIG. 3 shows the correspondence between an example of text content CZ and the extracted semantic data. In this example, the text content CZ is a zone selected by the user in a web page displayed on a browser space WP. It is shown on a grey background in the figure.

After triggering the inventive function, a "pop-up" window PW is displayed with the most relevant video content VC, and other relevant video content RVC. This window PW also displays the "category", concepts, names of persons and locations ("state or country") and raw semantic data ("Tags"). This information may not be displayed if it does not mean much to the user and is more useful internally. It is however displayed here to clarify the explanation.

The category "business" (deal, trade) is determined in this example based on the extracted concepts. Therefore, the concepts "Advertising" and "Sale" have the hypernym "Business". This inference is further strengthened by the presence of raw data such as "low price", "market", "bill-broking business", "shillings", etc.

Through the occurrence of several concepts in this semantic field, the inventive method may then automatically determine that the text content CZ relates to business.

A sub-step E2d consists of weighting the semantic data. As a function of the number of occurrences of each semantic datum and its synonyms and hypernyms, a weight may be assigned to identify the importance of the semantic datum, and to represent the text content CZ.

Higher weights may also be assigned.

In practice, this sub-step may be carried out at the same time as sub-step E2c.

It may also comprise a filtering of the semantic data to save only those whose weight exceeds a certain threshold or a limited number according to a ranking based on these weights, to be used in the later steps.

In one embodiment of the invention, it is possible to carry out a grammatical analysis of the text content CZ in order to determine the grammatical functions of the semantic data and to construct logical links between them.

This link may be formalised by a "subject-verb-object" relationship.

The inventive method seeks to identify "subject", "verb", and "object" functions within a sentence or a group of words, and by semantic analysis, to establish such a link among three extracted elements. Naturally, various approaches are possible.

One possible approach may consist of:

Extracting a subject from a sentence or group of words. This subject, the author of an action, may be identified as an individual, a known organisation, a real location, etc. A dictionary may be used for such an identification.

Detection of the verb in proximity to the extracted subject. Here again, a dictionary may be used to identify a verb form. It may also be planned to take into account conjugations and various forms of a given verb. Depending upon the form, one may extract supplemental semantic information to know whether this concern an action (action verb) or a state (passive, past participle).

Extraction of key words and concepts in proximity to the verb to identify the "object" of the action.

In order to improve the efficiency of this process, it may be planned to only take transitive verbs into account. These make it possible to construct a more immediate "subject-verb-object" relationship. To do so, the dictionary used to extract verb forms may contain only transitive verbs.

It may also be planned to subordinate the creation of a "subject-verb-object" relationship to the determination of an object also belonging to a corpus belonging to a dictionary. Following the example of the "subject", this "object" may be an individual, a known organisation, a real location, etc.

A step E3 may then consist of determining at least one service based on the semantic data.

In fact, some video content provision services are specialised in one theme (sports, news, artistic short films, education, etc.), and depending upon the semantic data extracted from the text content CZ, it may be relevant to target the most relevant services.

Generalist services such as DailyMotion or YouTube may also be queried, either systematically in addition, or occasionally if there are no services specialised in the extracted topic, or if those are insufficient.

Alternatively, the services may be identified statically by configuration.

A step E4 consists of automatically generating queries for the identified service or services, based on the semantic data.

Typically, this may involve constructing an HTTP (Hyper-Text Transfer Protocol) query containing all or part of the extracted semantic data as parameters.

These data may be used to construct a single query or several queries. Therefore, it is possible to construct as many queries as semantic data having a weight exceeding a certain threshold.

Also, in the implementation consisting of extracting "subject-verb-object" relationships, it may be possible to construct a different query for each relationship.

All of the text content CZ may be browsed sentence by sentence or word bloc by word bloc. For each sentence or word bloc, if there are "subject-verb-object" relationships, they may be used to construct queries; otherwise the queries may be constructed from the raw semantic data.

These queries make it possible to retrieve a set of videos available on the identified service or services.

These videos may then be presented to the user in the man-machine interface WB and more specifically in the browser space WP.

In one embodiment of the invention, it is possible to implement a criterion of semantic proximity between the text content CZ and the retrieved videos.

Semantic proximity may be calculated based on the semantic data extracted from the text content CZ in the previous steps and semantic content associated with the retrieved videos. These data may be raw data saved by users: "tags", fields: "Title", "Description", etc.

It is also possible to implement an analysis of the retrieved videos.

Therefore, it is possible to fairly easily determine textures (sea, sand, ice, etc.) and/or colours.

It is also possible to implement shape recognition algorithms. These may seek to determine known forms from constants (that is to say, portions of shapes that do not change depending upon the viewing angle).

Various approaches may be used together to obtain a synergy:

For example determining a seal by shape analysis may make it possible to confirm that the texture detected is in fact ice. One can then reduce errors and increase the reliability of the result.

In another example, the determination of a colour correlated with the determination of a shape can make it possible to add meaning. One can therefore determine the presence of a "black horse", a more discriminant concept than the simple determination of a horse.

It is possible to carry out a global analysis of an image from the video (or a sequence of images). Therefore, one can analyse the ambient light level and draw semantic information from it. For example one might determine whether it is day or night if one had also detected that the scene was outdoors.

By comparing this information, it is possible to determine a distance, in particular by using an ontology.

Various methodologies are also possible for establishing such a distance.

In particular:

Heuristic metrics between concepts in a given ontology, based on a distance to be covered in a graph. This distance might be the number of nodes on a graph where nodes are key words or concepts. Certain pairs are directly connected by a link. Links may be directional or symmetric. If a link between two words is symmetric, the relationship between the two words is stronger. This distance may make it possible to quantify the similarity of two concepts for example. It may also serve the purpose of disambiguation.

TF-IDF (Term Frequency-Inverse Document Frequency) methods are weighting methods often used in information searching and in particular in text comparison. This statistical measurement makes it possible to evaluate the importance of a term contained in a document, relative to a collection or corpus. The weight increases in proportion to the number of occurrences of the word in the document. It also varies based on the frequency of the word in the corpus. Alternatives to the original formula are often used in search engines to assess the relevance of a document in relation to the user's search criteria.

For example, if the word "dinosaur" has a low occurrence in the IDF corpus, this may mean that it is more important as it is more discriminant than a more common word; if the word appears in each 'TF' list (list linked to the corpus extracted from the context and the list linked to the corpus extracted from the description of the video) of words extracted, based on its number of occurrences, one may give it a higher or lower weight. The fact of finding the word on both lists makes it possible to define a more or less strong link based on the IDF value.

One may also combine the two approaches. For example, in the first list of words extracted from the context, one finds the word "dinosaur", which has a relatively high weight in the IDF corpus. In the second list extracted from the video description, one finds the word "tyrannosaurus". The graph shows that there is a symmetrical link with two hops (number of nodes in the graph). Therefore, one can consider that the context of this video shows a similarity with an IDF value/number of hops.

By applying this algorithm to each word, one can thus calculate an overall similarity.

Based on the distances of each of the retrieved videos, it is possible to order them so as to present them to the user in the most relevant way: therefore, the video with the closest proximity to the text content CZ will be presented before the other relevant videos retrieved.

It is also possible to select a sub-set of the retrieved videos based on a proximity criterion.

This may involve selecting only a predetermined number of videos, as a function of a ranking based on their semantic distance from the text content CZ.

It may also involve selecting only the videos corresponding to a semantic distance below a predetermined threshold. This embodiment may therefore show no video content to the user if none of the retrieved videos are sufficiently close.

Other alternatives and embodiments are also possible and accessible to the person skilled in the art. The invention can therefore not be understood as being limited to the implementations described above.

The invention claimed is:

1. A method for assisting video content searches over a communication network for a user, comprising:
   receiving a first content item from said user, wherein the first content item is textual and comprises a browser or a selected portion of an e-book or a PDF file;
   automatically extracting semantic data from the first content item;
   automatically generating queries for at least one service, as a function of said semantic data, making it possible to retrieve a set of videos on said at least one service, wherein said at least one service is determined based on said semantic data; and
   presenting said set of videos to said user,
   wherein said method further comprises selecting a sub-set of videos from among said set, based on a criterion of semantic proximity between said first content and a description associated with the videos in said set.

2. The method according to claim 1, wherein said automatically extracting semantic data from the first content item further comprises:
   extracting semantic data sentence by sentence or sentence block by sentence block;
   determining refined semantic data comprising concepts;
   weighting the extracted semantic data.

3. The method according to claim 1, wherein said method may be triggered by the selection of a first content item in a man-machine interface and by the selection of a software function accessible through said man-machine interface.

4. The method according to claim 1, wherein said automatically extracting semantic data comprises extracting "subject-verb-object" relationships.

5. The method according to claim 1 wherein the queries generated are constructed based on said relationships.

6. A communication terminal equipped with a processor configured to implement a method for assisting video content searches over a communication network for a user, comprising:
   receiving a first content item from said user, wherein the first content item is textual and comprises a browser or a selected portion of an e-book or a PDF file;
   automatically extracting semantic data from the first content item;
   automatically generating queries for at least one service, as a function of said semantic data, making it possible to retrieve a set of videos on said at least one service, wherein said at least one service is determined based on said semantic data; and
   presenting said set of videos to said user,
   wherein said method further comprises selecting a sub-set of videos from among said set, based on a criterion of semantic proximity between said first content and a description associated with the videos in said set.

7. A non-transitory computer-usable data carrier storing instructions that, when executed by a computer, cause the computer to execute a method for assisting video content searches over a communication network for a user, comprising:
   receiving a first content item from said user, wherein the first content item is textual and comprises a browser or a selected portion of an e-book or a PDF file;
   automatically extracting semantic data from the first content item;
   automatically generating queries for at least one service, as a function of said semantic data, making it possible to retrieve a set of videos on said at least one service, wherein said at least one service is determined based on said semantic data; and
   presenting said set of videos to said user,
   wherein said method further comprises selecting a sub-set of videos from among said set, based on a criterion of semantic proximity between said first content and a description associated with the videos in said set.

8. A man-machine interface for a communication terminal, equipped to enable a user to select a first content item and to make it possible to trigger:
   automatically extracting semantic data from said first content item, wherein said first content item is textual and comprises a browser or a selected portion of an e-book or a PDF file;
   automatically generating queries for at least one service, as a function of said semantic data, making it possible to retrieve a set of videos on said at least one service, wherein said at least one service is determined based on said semantic data;
   presenting said set of videos to said user;
   automatically selecting a sub-set of videos from among said set, based on a criterion of semantic proximity between said first content and a description associated with the videos in said set.

9. A method for assisting video content searches over a communication network for a user, comprising:
   automatically determining a first content item for said user as a function of a displayed web page, a video being played, or the content of an email being read;
   automatically extracting semantic data from said first content item;
   automatically generating queries for at least one service, as a function of said semantic data, making it possible to retrieve a set of videos on said at least one service, wherein said at least one service is determined based on said semantic data;

presenting said set of videos to said user;

wherein said method further comprises automatically selecting a sub-set of videos from among said set, based on a criterion of semantic proximity between said first content and a description associated with the videos in said set.

\* \* \* \* \*